United States Patent
Tansek

(10) Patent No.: US 11,237,246 B1
(45) Date of Patent: Feb. 1, 2022

(54) PULSED RADAR WITH MULTISPECTRAL MODULATION TO REDUCE INTERFERENCE, INCREASE PRF, AND IMPROVE DOPPLER VELOCITY MEASUREMENT

(71) Applicant: David Tansek, Leesburg, FL (US)

(72) Inventor: David Tansek, Leesburg, FL (US)

(73) Assignee: DBTSYSTEMS LLC, Leesburg, FL (US)

( * ) Notice: Subject to any disclaimer, the term of this patent is extended or adjusted under 35 U.S.C. 154(b) by 0 days.

(21) Appl. No.: 17/240,697

(22) Filed: Apr. 26, 2021

Related U.S. Application Data

(60) Provisional application No. 63/051,143, filed on Jul. 13, 2020.

(51) Int. Cl.
*G01S 7/282* (2006.01)
*G01S 13/58* (2006.01)
*G01S 7/02* (2006.01)

(52) U.S. Cl.
CPC .............. *G01S 7/282* (2013.01); *G01S 7/023* (2013.01); *G01S 7/0232* (2021.05); *G01S 7/0234* (2021.05); *G01S 13/581* (2013.01)

(58) Field of Classification Search
CPC .......... G01S 13/42; G01S 7/282; G01S 7/023;
G01S 13/76; G01S 7/0232; G01S 7/0234;
G01S 13/581; G01S 13/56; G01S 13/04;
G01S 13/22; G01S 13/106; G01S 13/227;
G01S 13/222; G01S 13/931; G01S 13/88;
G01S 7/28; G01S 13/582; G01S 7/497;
G01S 13/26; G01S 7/352; G01S 7/484;
G01S 13/584; G01S 13/343; G01S 7/285;
G01S 7/4004; G01S 7/032; G01F 23/284;
G01F 23/0069

See application file for complete search history.

(56) References Cited

U.S. PATENT DOCUMENTS

| | | | | |
|---|---|---|---|---|
| 4,053,884 A | * | 10/1977 | Cantrell | G01S 7/2921 342/109 |
| 4,107,673 A | * | 8/1978 | Gross | G01S 7/06 342/185 |
| 5,847,677 A | * | 12/1998 | McCorkle | G06F 7/582 342/204 |
| 2004/0178944 A1 | * | 9/2004 | Richardson | G01S 13/904 342/43 |
| 2007/0229349 A1 | * | 10/2007 | Kajio | G01S 13/87 342/82 |
| 2008/0136704 A1 | * | 6/2008 | Chan | G01S 13/24 342/201 |

(Continued)

FOREIGN PATENT DOCUMENTS

| | | | | |
|---|---|---|---|---|
| JP | 2004170183 A | * | 6/2004 | |
| WO | WO-2017027833 A1 | * | 2/2017 | G01S 7/35 |

*Primary Examiner* — Olumide Ajibade Akonai
(74) *Attorney, Agent, or Firm* — Ashkan Najafi

(57) ABSTRACT

A pulse radar system and method has long range unambiguous image reflections at high pulse repetition frequency (PRF), long range high resolution radial velocity not limited by Doppler Nyquist limiting, improved signal sensitivity, and strong in-band interference rejection, thereby improving existing radar by increasing the transmission pulse rate by uniquely tagging each outgoing pulse so they can be easily separated when received.

20 Claims, 6 Drawing Sheets

Adaptive Modulator

(56) References Cited

U.S. PATENT DOCUMENTS

| | | | |
|---|---|---|---|
| 2009/0051587 A1* | 2/2009 | Lancashire | G01S 13/9056 342/25 F |
| 2010/0201564 A1* | 8/2010 | Foster | G01S 13/753 342/159 |
| 2016/0327422 A1* | 11/2016 | Gluth | G01S 7/285 |
| 2021/0190912 A1* | 6/2021 | Feng | G01S 7/415 |

* cited by examiner

DM Modulation

Adaptive Modulator

Signal Processor Example for I/F amplifier N

PULSED RADAR WITH MULTISPECTRAL MODULATION TO REDUCE INTERFERENCE, INCREASE PRF, AND IMPROVE DOPPLER VELOCITY MEASUREMENT

CROSS REFERENCE TO RELATED APPLICATIONS

This is a non-provisional patent application that claims priority to and benefit of U.S. provisional patent application No. 63/051,143 filed Jul. 13, 2020, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to pulse radar systems and, more particularly, to a pulse radar system and method that has long range unambiguous image reflections at high pulse repetition frequency (PRF), long range high resolution radial velocity not limited by Doppler Nyquist limiting, improved signal sensitivity, and strong in-band interference rejection, thereby improving existing radar by increasing the transmission pulse rate by uniquely tagging each outgoing pulse so they can be easily separated when received.

Prior Art

The current radar systems are limited by their inability to have a high pulse repetition frequency (PRF) and unambiguously detect objects that are at a large distance. This phenomenon is because a return from a distant object may be from a pulse that was transmitted earlier. The false, or ghost, return presents a serious limit on how well the radar will detect objects.

The compromises that are in current radar systems include: How fast a radar scans the volume; How high the PRF is; The angular resolution; Doppler velocity range; in-band interference; Radiated power; and other limits.

U.S. Pat. No. 7,233,279 uses the variable modulation to mask signals, and does not use them to detect multiple passes. It also only uses three frequencies and separates them by amplitude to detect an object. U.S. patent Ser. No. 10/365,349 uses multiple antennas and polarization differences, not modulation of the carrier. U.S. patent Ser. No. 10/365,349 uses multiple antennas and uses a pulse codes that are orthogonal to each other. U.S. Pat. No. 9,720,080 transmits data instructions over a radar signal. U.S. Pat. No. 7,791,528 uses multiple carrier frequencies and signal phases to detect an object. U.S. Pat. No. 9,568,601 is a non-pulsed radar that uses a tone modulation to detect an object. U.S. Pat. No. 7,786,927 uses a sweep modulation of a non-pulsed radar. U.S. Pat. No. 9,784,832 uses a pulsed radar but changes polarization between pulses. U.S. Pat. No. 6,809,681 discloses multiple pulse radar using uncorrelated clutter to separate signals. U.S. Pat. No. 4,490,720 discloses multiple pulse radar using variable pulse widths to separate return pulses.

Accordingly, a need remains for pulse radar systems and methods in order to overcome at least one of the above-noted shortcomings. The exemplary embodiment(s) satisfy such a need by a pulse radar system and method that has long range unambiguous image reflections at high pulse repetition frequency (PRF), long range high resolution radial velocity not limited by Doppler Nyquist limiting, and strong in-band interference rejection, that is convenient and easy to use, durable in design, versatile in its applications, and designed for improving existing radar by increasing the transmission pulse rate by uniquely tagging each outgoing pulse so they can be easily separated when received.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a pulse radar system and method that has long range unambiguous image reflections at high pulse repetition frequency (PRF), long range high resolution radial velocity not limited by Doppler Nyquist limiting, improved signal sensitivity, and strong in-band interference rejection, thereby improving existing radar by increasing the transmission pulse rate by uniquely tagging each outgoing pulse so they can be easily separated when received. These and other objects, features, and advantages of the non-limiting exemplary embodiment(s) are provided by a pulse radar system including a pulse generator located at a first location and configured to create at least one pulse having a modulation signal and a carrier signal. Such a modulation signal is configured to be changed with each successive one of the at least one pulse such that the at least one pulse is easily separated from each other at a remote second location. The pulse radar system further includes a modulator in communication with the pulse generator and configured to emit the modulation signal wherein the modulator is further configured to react to commands from the pulse generator to change the modulation signal. Advantageously, based on the commands received from the pulse generator, the modulator is further configured to dynamically change a modulation type of the modulation signal selected from a group of modulation types including an amplitude modulation, a frequency modulation, a digital pattern modulation, and a random pattern generation modulation. The pulse radar system further includes a signal processor in communication with the at least one intermediate-frequency amplifier, and configured to process each the modulation signal from the at least one intermediate-frequency amplifier. Notably, the each successive one of the at least one pulse is non-transitory and repeats after a time interval. Advantageously, the each successive one of the at least one pulse is configured to have an increased transmission pulse rate and further configured to be uniquely tagged and thereby easily separated when received at the remote second location. In this manner, each successive one of the at least one pulse is distinguished such that the radar system is configured to act efficiently as a very high pulse repetition frequency radar system, a long range radar system, a long range velocity detection radar system, and a high angular resolution radar system.

In a non-limiting exemplary embodiment, the signal processor is further configured to render a composite display of each returned one of the modulation signal.

In a non-limiting exemplary embodiment, the modulator is configured to use a combination of the modulation types based on real-time operating parameters at the first location and the remote second location.

In a non-limiting exemplary embodiment, the signal processor is further configured to create an aggregate signal composed of each the returned one of the modulation signal.

In a non-limiting exemplary embodiment, the pulse radar system further includes an amplifier in communication with the modulator and the pulse generator and configured to boost the at least one pulse emitted from an existing transceiver.

In a non-limiting exemplary embodiment, the pulse radar system further includes a switch in communication with the existing transceiver and positioned along a receiver signal path. Such a switch is configured to separate the at least one pulse traveling along the receiver signal path.

In a non-limiting exemplary embodiment, the pulse radar system further includes a low noise amplifier in communication with the switch via the receiver signal path, and configured to boost the at least one pulse.

In a non-limiting exemplary embodiment, the pulse radar system further includes a bandpass filter in communication with the low noise amplifier, and configured to pass the carrier signal and existing relevant sideband image signals of the modulation signal. Such a bandpass filter is further configured to remove unwanted signals from the modulation signal.

In a non-limiting exemplary embodiment, the pulse radar system further includes a demodulator in communication with the bandpass filter, and configured to expose the modulation signal from the carrier signal.

In a non-limiting exemplary embodiment, the pulse radar system further includes a bank of filters in communication with the demodulator, and configured to split the modulation signal into the modulation types based on associated ones of the real-time operating parameters.

In a non-limiting exemplary embodiment, the bank of filters are configured to use information from the pulse generator to decode the modulation signal.

In a non-limiting exemplary embodiment, the pulse radar system further includes at least one intermediate-frequency amplifier in communication with the bank of filters, and configured to boost the modulation signal based on time since the at least one pulse was transmitted to normalize signal amplitude based on signal loss passing thru an existing scanned media.

In a non-limiting exemplary embodiment, the signal processor is further configured to use multiple ones of the returned modulation signals to generate a positional value or range difference value between alternate ones of the at least one pulse and thereby determine a velocity of a target object. Notably, the information about the at least one pulse is sent to the modulator and to the signal processor.

In a non-limiting exemplary embodiment, the at least one pulse includes one of a single pulse and a pulse signal sequence.

In a non-limiting exemplary embodiment, the switch includes a passive device.

In a non-limiting exemplary embodiment, the filters includes one of physical filters and logical filters.

In a non-limiting exemplary embodiment, the modulation type is configured to be dynamic and split by the filter wherein the pulse generator passes a data parameter set to the modulator, the bandpass filter, the at least one intermediate-frequency amplifier, and the signal processor.

In a non-limiting exemplary embodiment, the signal processor is further configured to use a time-of-flight and a phase of the modulation of the at least one pulse to determine a precise range of the object that reflected the at least one pulse. Such a signal processor is configured to use a range change and a time interval between successive ones of the at least one pulse to determine a velocity of the object.

In a non-limiting exemplary embodiment, doppler dilemma is eliminated by using the modulation type of the modulation signal instead of the carrier signal to determine object range.

In a non-limiting exemplary embodiment, the signal processor is further configured so that interference is reduced by filtering the carrier signal and the modulation signal, so only selected one of the modulation signals that pass both of the bank of filters and the bank of filters are tagged as a valid modulation signal. Advantageously, the signal processor is further configured to detect interference and notify the pulse generator to use one of the modulation types that is less susceptible to the interference. In this manner, the signal processor is further configured to reject an offending signal that does not correlate to one of the at least one pulse received prior or subsequently to the offending signal.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
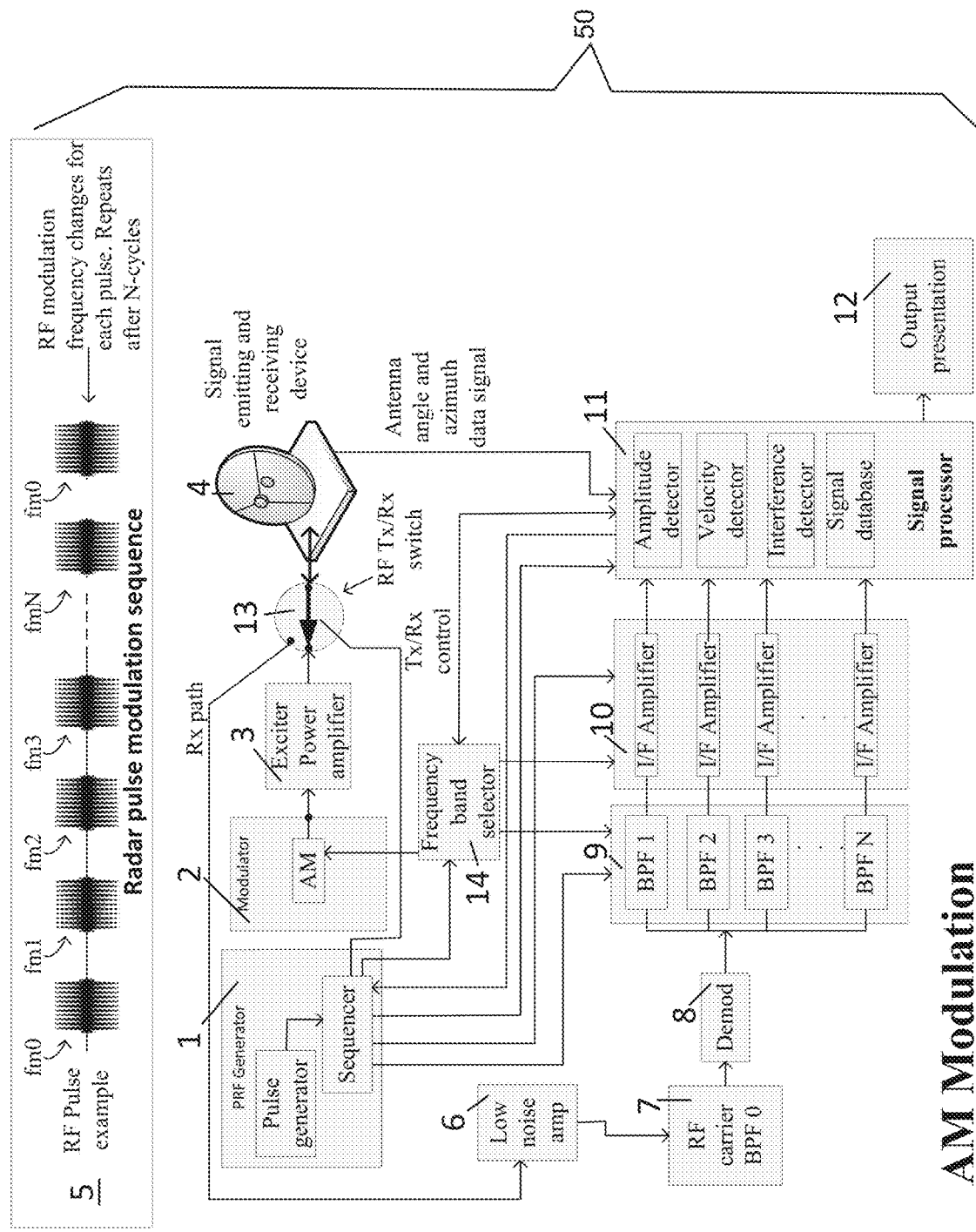
FIG. 1 is a schematic block diagram of a pulse radar system including an AM modulation, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

All signals referred to herein are non-transitory signals. The term "pulse" means non-transitory pulse signal and can be a single, non-transitory pulse signal or a sequence of non-transitory pulse signals, for example.

The non-limiting exemplary embodiment(s) is/are referred to generally in FIGS. 1-7 and is/are intended to provide pulse radar system(s) and method(s) that have long range unambiguous image reflections at high pulse 5 repetition frequency (PRF), long range high resolution radial velocity not limited by Doppler Nyquist limiting, and strong in-band interference rejection, thereby improving existing radar by increasing the transmission pulse 5 rate by uniquely tagging each outgoing pulse 5 so they can be easily separated when received. It should be understood that the exemplary embodiment(s) may be used to detect a variety of objects, and should not be limited to any particular object described herein.

Referring to FIGS. 1-7 in general, in a non-limiting exemplary embodiment(s), the system overcomes the shortcomings listed hereinabove. The technique is to tag each radar pulse 5 with a modulation that is easily separated from prior and future pulses. The uniquely tagged pulses will thus emulate radar system(s) 50 running at a very low PRF. The aggregated signal processing yields a very high resolution, high PRF, long range radar system 50. Since the PRF can be high, the volume scan rate can also be high.

The multi-modulation system employed effectively reduces or eliminates in-band signals from jamming sources or other interference. The same methods can be applied to Sonar, Lidar, and other remote sensing systems.

FIG. 1 presents the multi-modulation system using a pulsed radar carrier. The signal carrier is the radar frequency. The frequency is not changed for each pulse 5. The amplitude is modulated with a high frequency modulation (fm). The fm is typically in the 100 Mhz to 500 Mhz range for a 5 Ghz radar carrier with a 0.8 usec pulse width. Shorter pulse widths or different radar frequencies may require a different modulation frequency. If another radar is using the same base radar frequency (5 Ghz in this scenario), then the fm frequencies could be changed so as not to conflict with the other radar.

Figure 2:
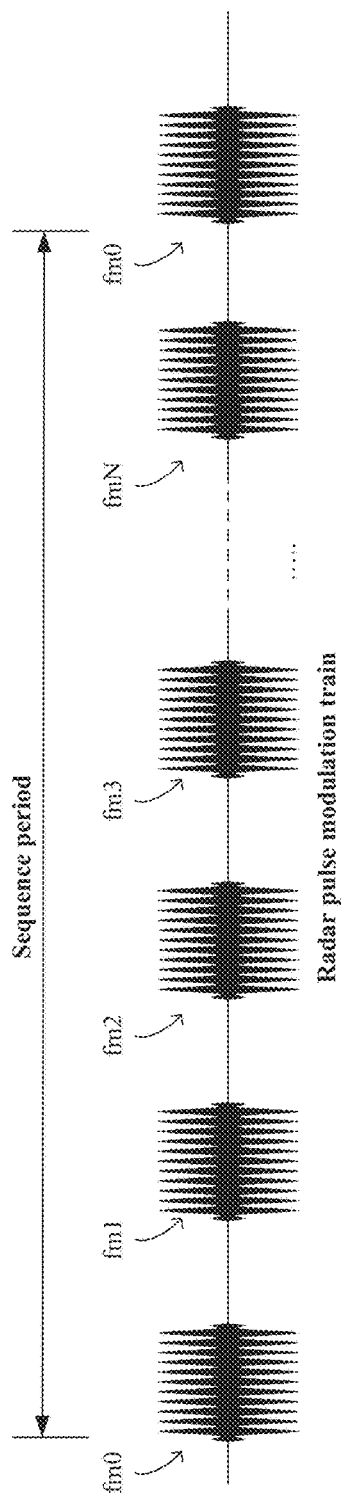
FIG. 2 is a schematic diagram illustrating a radar pulse modulation train, in accordance with a non-limiting exemplary embodiment of the present disclosure.

As FIG. 2 shows, the fm is changed on every pulse 5; fm0 is the first carrier modulation frequency, fm1 the second frequency, fm2 the third frequency, and so on. After the Nth pulse 5, fmN, the pulse 5 train starts at fm0 again and the cycle repeats. The different frequencies tag each pulse 5 so they can be identified on their return. This tagging function is used to separate each return by its fm.

Other systems have used different techniques to be able to separate prior or future pulses. One system employs beam polarization. This has side effects as polarization reacts differently on targets. It also is limited to two pulses.

Another system uses three frequency changes but relies on range amplitude attenuation attributes to eliminate ghost pulses.

Figure 3:
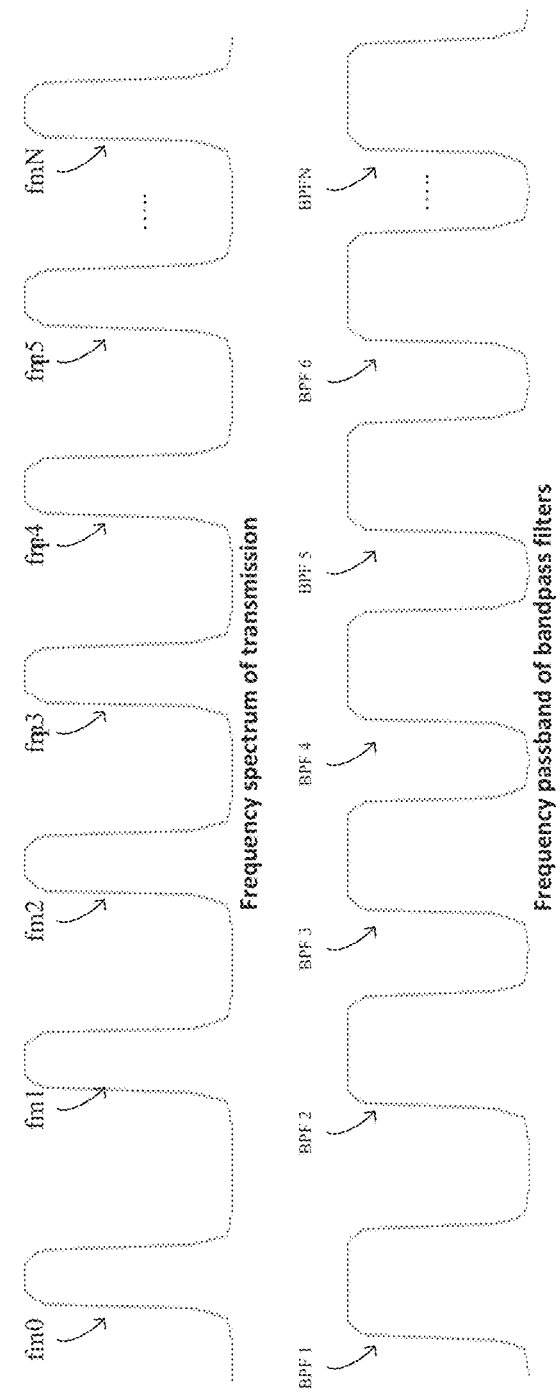
FIG. 3 is a schematic diagram illustrating a signal frequency spectrum of transmission and a signal frequency passband of bandpass filters, in accordance with a non-limiting exemplary embodiment of the present disclosure.

FIG. 1 shows the basic block diagram for an amplitude modulated system. The pulse generator 1 starts the pulse 5 train sequence. It will generate a pulse 5 for each frequency in the sequence fm0 through fmN. This data and timing is sent to the frequency sequencer. The sequencer sends data to the bandpass filter 7 processor to identify what modulation parameters were used for this pulse 5. The sequencer also sends data to the frequency band selector 14 to set the modulation for the pulse 5. The sequencer also sends data to the I/F amplifier 10 to identify the start of the pulse 5 for gain control. The sequencer receives data from the signal processor 11 regarding interference issues. The sequencer sends data to the signal processor 11 to identify the modulation parameters used on a pulse 5. The sequencer sends switch control to the Tx/Rx switch 13 to switch between transmit output and receiver input from the antenna. The modulator 2 receives modulation parameters from the Frequency Band Selector 14 to set the fm frequency of the pulse 5. The Frequency Band Selector 14 steps through the different modulation frequencies fm0, fm1, fm2, to fmN and also sets the bandwidth of the modulation applied to the carrier. (FIG. 3 shows the frequency spectrum of the transmitted pulses and also shows the passband of the bandpass filters 7 in FIG. 1.) The modulator 2 sends the Exciter and Power Amplifier 3 the modulation to apply to the carrier generated by the exciter.

The exciter and power amplifier 3 creates the high-powered modulated signal. This can be a magnetron, a klystron, or other amplifier 3. The fm0 through fmN modulation frequencies can be derived thru many different techniques; such as resonators, power supply changes, mixers, or passive wave shapers. The transmitter antenna/receive antenna 4 can be a dish, a phased array, or other emitter type. The exciter and power amplifier 3 sends the signal to be radiated to the Tx/Rx Switch 13. The Tx/Rx Switch 13 pass the output signal to the antenna 4. The sequencer (pulse generator) 1 changes the switch setting to the Tx path position at the moment when the exciter and power amplifier 3 create the outgoing pulse 5. After the pulse 5 is complete, the sequencer 1 switches the antenna 4 to the Rx return pulse 5 signal path.

The Tx/Rx switch 13 sends the returned pulse 5 from the antenna to the low noise amplifier 6 (LNA). The received signal; which is a composite of pulses from the fm0 thru fmN depending on the distance each object is from the antenna 4. This signal is sent to a broad band amplifier 6. The amplifier 6 boosts the signal and then sent to a bandpass filter 7.

The LNA 6 amplifies the signal and sends it to the first bandpass filter 7 RF Carrier BPF0. This filters out signals within the frequency band of the exciter generated in the Exciter and Power Amplifier 3 stage. The RF Carrier BPF0 7 is used to eliminate signals outside the Exciter carrier frequency, but is broad enough to pass the sidebands in the modulation spectrum caused by the amplitude modulation fm0 thru fmN. The RF Carrier BPF0 7 feeds the signal to the demod 8. The demod 8 separates the modulation created by the modulator 2 and feeds the signal to the bandpass filters 9. A demodulator 8 is used to separate the radar carrier (5 GHZ in this example) so only the fm0 thru fmN signals are present. The demodulator 8 distributes the signal to multiple bandpass filters 9. Each filter only allows a specific fm to pass thru; BPF1 will only pass fm0, BPF2 only passes fm1, BPF3 only passes fm2, and so on. Each output from the bandpass filters 9 are amplified thru the I/F amplifiers 10. Each bandpass filter 9 only passes the pulses that are in the frequency band that is defined by the Frequency Band Selector 14 input. The bandpass filter bank 9 output feeds the I/F amplifiers bank 10. The I/F amplifiers 10 boost the signal level and adjust the signal gain based on the amount of signal lost traversing the medium to the target and back again. The I/F amplifier 10 outputs feed the Signal processor 11. The Signal processor 11 receives azumith and elevation angle from the antenna 4. The Signal processor 11 also receives modulation parameters from the Frequency Band Selector 14 and modulation type data from the sequencer 1. The Signal processor 11 outputs interference data to the sequencer 1 and creates a presentation 12 for users.

Figure 5:
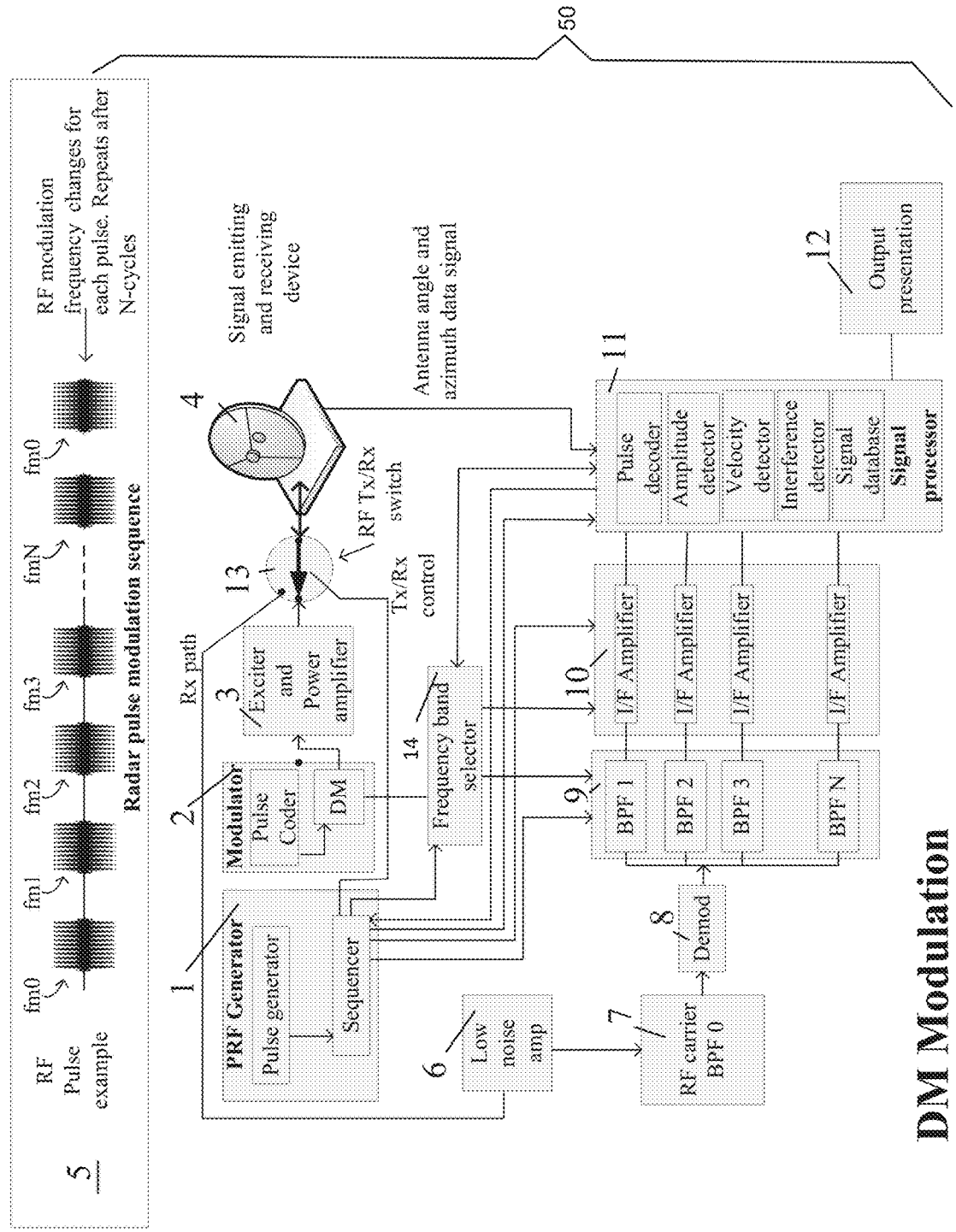
FIG. 5 is a schematic block diagram of a pulse radar system including an DM modulation, in accordance with a non-limiting exemplary embodiment of the present disclosure.
Figure 6:
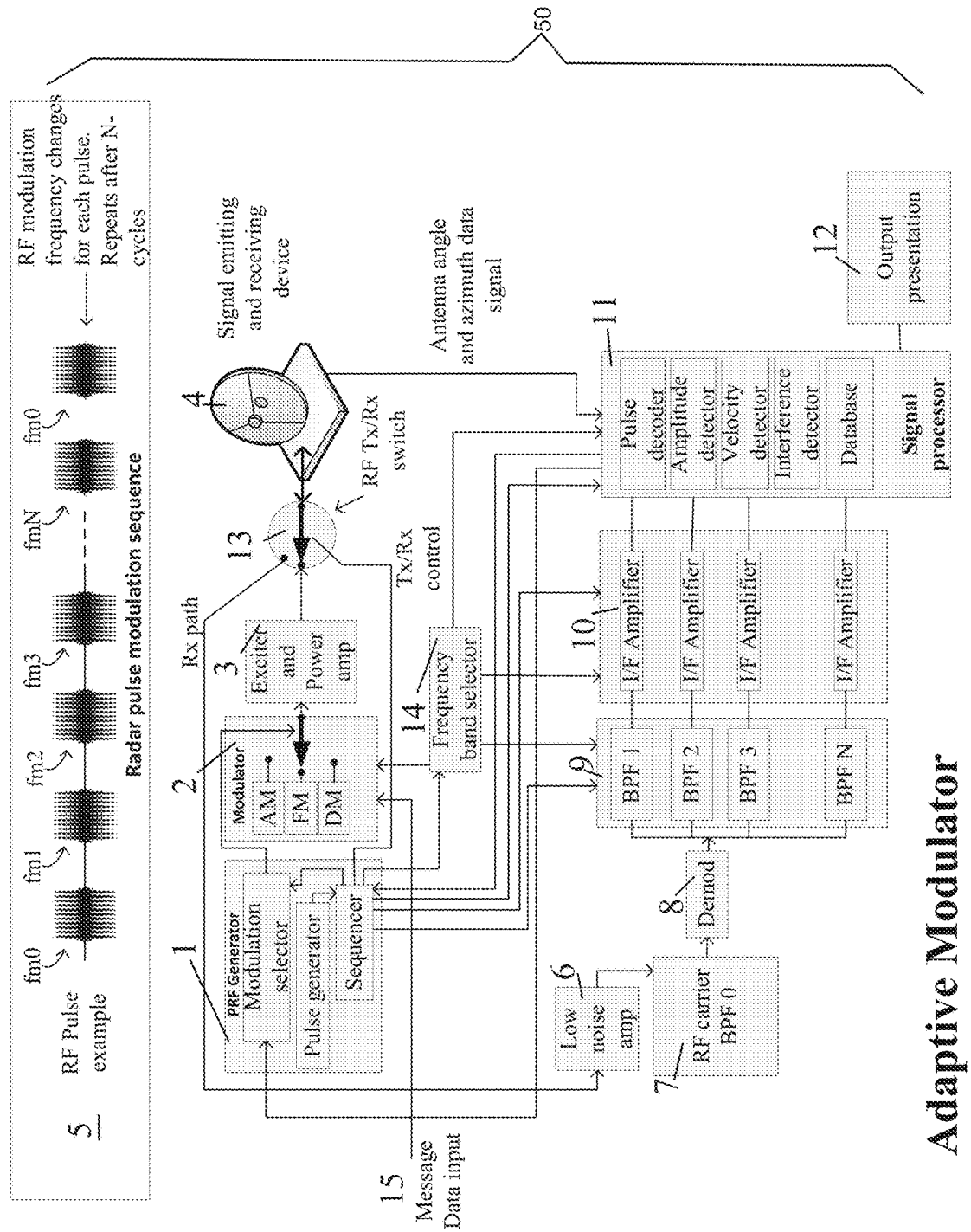
FIG. 6 is a schematic block diagram of a pulse radar system including an adaptive modulation, in accordance with a non-limiting exemplary embodiment of the present disclosure.
Figure 7:
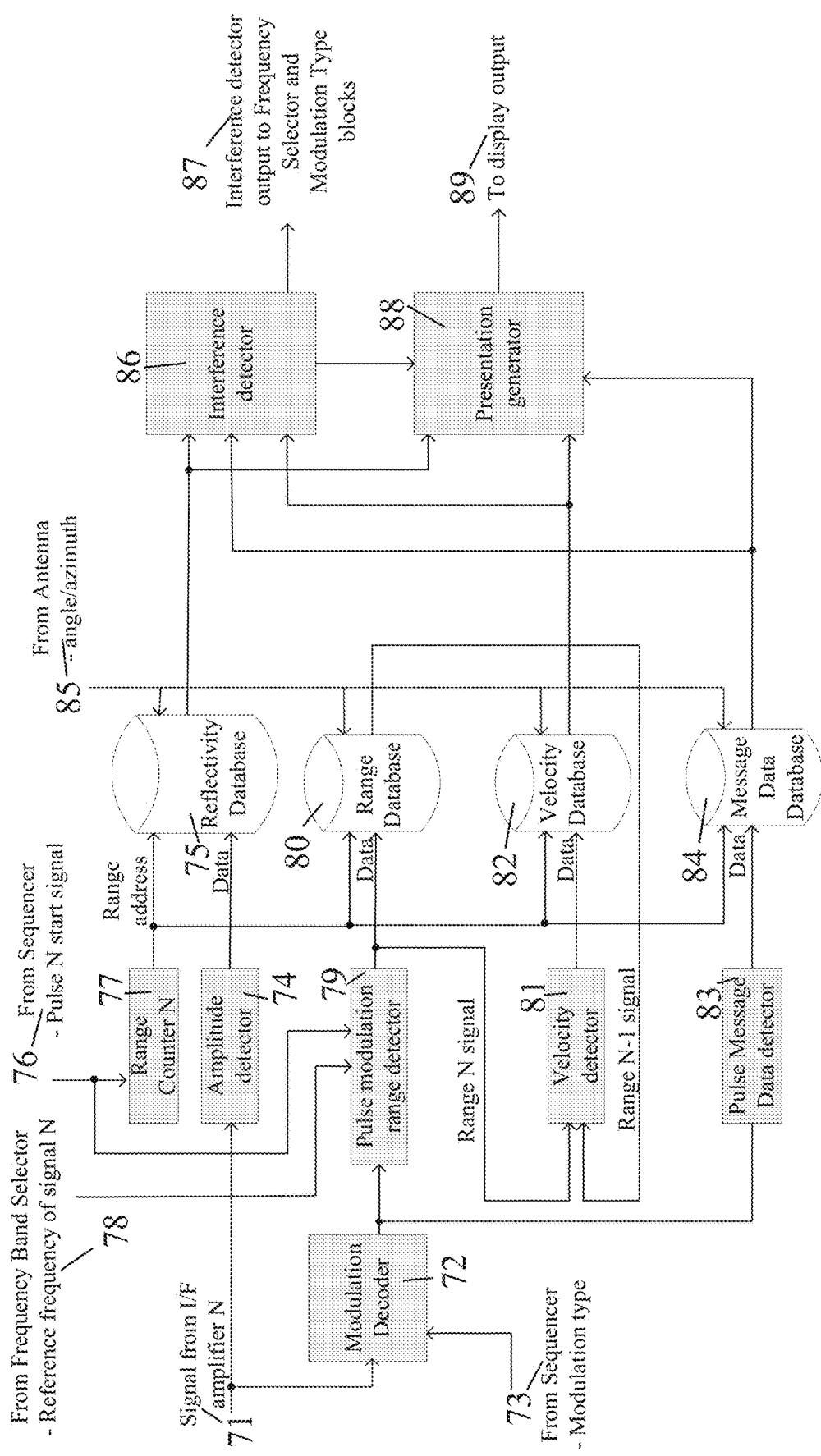
FIG. 7 is a schematic block diagram of a signal processor example for I/F amplifier N, in accordance with a non-limiting exemplary embodiment of the present disclosure.

FIG. 7 is an example of the Signal processor 11 shown in FIGS. 1, 4, 5, and 6. The drawing shows one of N paths within the Signal processor 11. Each path is identical and processes a single I/F Amplifier input. The input 71 from the I/F Amplifier N (also 10 in FIG. 1, 4, 5, 6) feeds the Modulation Decoder 72 and the Amplitude Detector 74. The Amplitude detector 74 measures the signal strength of the returned signal. This data is stored in the Reflectivity Database 75. The Modulation Decoder 72 uses the modulation data type from sequencer 73 (also at 1 in FIG. 1, 4, 5, 6) to decode the signal and feeds it to the Pulse Modulation Range Detector 79 and the Pulse Message Data Detector 83. The Pulse Modulation Range Detector 79 compares the returned signal with the Frequency Band Selector reference frequency signal 78 and the Sequencer Pulse N Start signal 76 to determine the exact range of the object that reflected the signal. The range calculation uses the number of cycles of the reference frequency from the start pulse 5 and the phase difference between the reference signal and the returned signal. This provides an accurate range signal. This range value is feed to the Velocity Detector 81 and the Range Database 80.

The velocity detector 81 compares the range values from pulse n and from pulse n−1 to determine the change in distance to the reflecting object. The velocity is determined by calculating velocity n=([distance n]−[distance n−1])/[time between pulses n and n−1]. The velocity is stored in the velocity database 82. The pulse message detector 83 decodes the message in the received signal from the modulation decoder 72. The data is stored in the message data database 84. The databases 75, 80, 82, and 84 use the range counter 77 and the antenna angle/azimuth 85 data to tag every entry in every database entry. This tagged entry is called a volume data cell. Each data value is located in a volume cell. The interference detector 86 compares data values for each volume data cell from each database to determine if false data is present. If it is detected, then it sends the data to frequency selector and modulation type 87 (in FIG. 1, 4, 5, 6). The presentation generator 88 uses the data values from the reflectivity database 75, velocity database 82, the message database 84, and the interference detector 86 to render a display output 89 to present to users.

Figure 4:
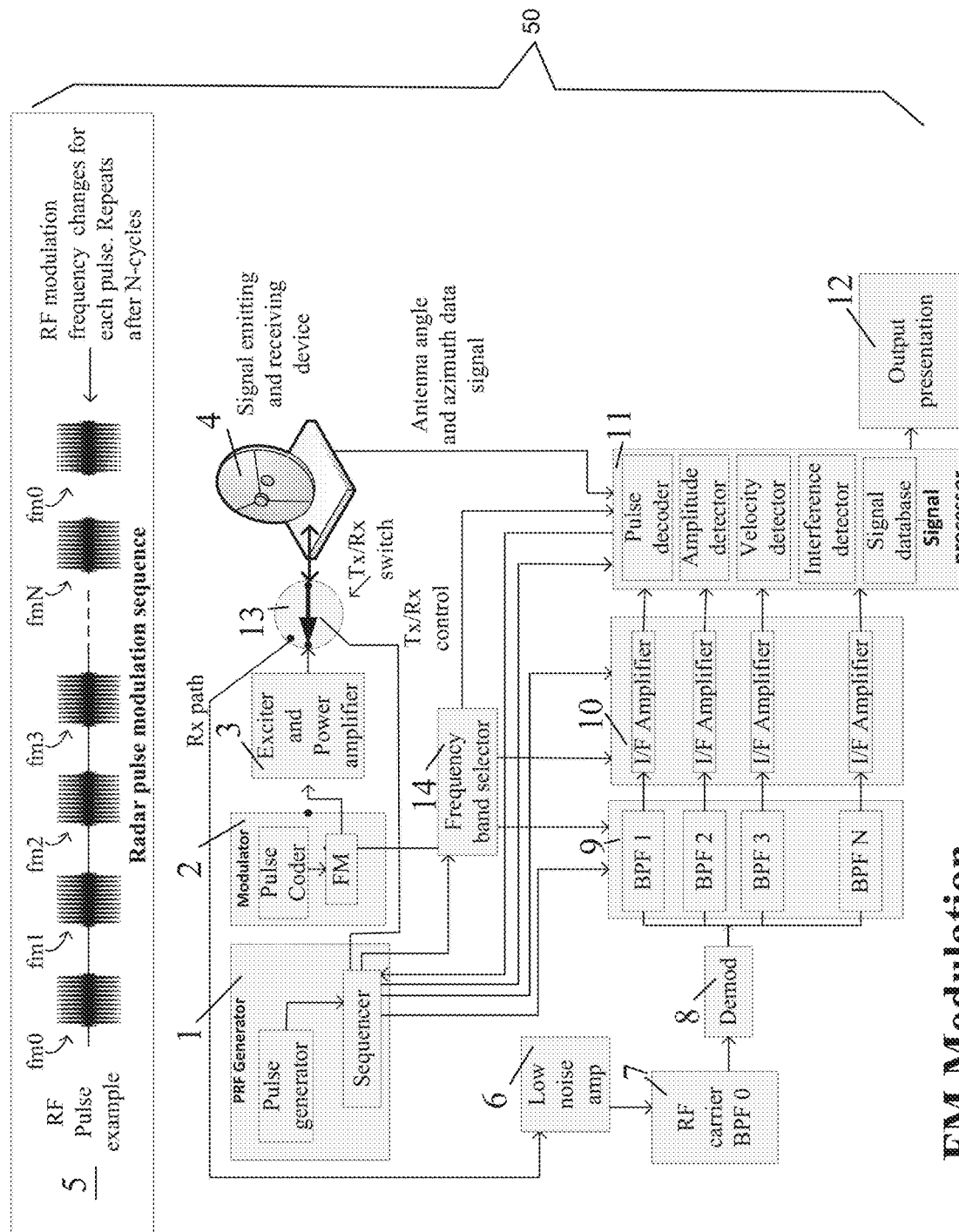
FIG. 4 is a schematic block diagram of a pulse radar system including an FM modulation, in accordance with a non-limiting exemplary embodiment of the present disclosure.

FIG. 4 is a frequency modulated example. This is very similar to FIG. 1 and the description is the same except for the modulator 2. The modulator 2 uses multiple frequencies to encode pulse 5 codes. These pulse 5 codes can provide message data in the transmission. The bandwidth of frequency modulated signal will stay within the passband presented in FIG. 3 for the frequency band defined by the frequency band selector 14.

FIG. 5 is a digital modulated example. This is very similar to FIG. 4 and the description is the same except for the modulator 2. The modulator 2 uses digital code sequences to encode pulse 5 codes. These pulse 5 codes can provide message data in the transmission. The bandwidth of frequency modulated signal will stay within the passband presented in FIG. 3 for the frequency band defined by the frequency band selector 14.

FIG. 6 is an adaptive modulated example. This is very similar to FIG. 1 and the description is the same except for the modulator 2. The modulator 2 uses a selectable modulation technique that can change the modulation for every pulse 5. External message data input 15 can define the encoded pulse 5 codes used by the modulator 2. These pulse 5 codes can provide message data in the transmission. The bandwidth of frequency modulated signal will stay within the passband presented in FIG. 3 for the frequency band defined by the frequency band selector 14.

Surveillance Mode Processing

The signal processor 11 uses time-of-flight (TOF) calculations for each fm from each I/F amplifier 3 based on the time information from the frequency selector 14. Each of the I/F amplifier 10 signal amplitudes are placed at a different database location on a regular time sequence called a signal gate period. The signal processor 11 then aggregates all the signals in the database into a high angular resolution display product. This is accomplished by applying the data from each pulse 5 to an Azimuth and Angle based on the transmitted sequence.

Each fm signal has a range based on the formula:

$$D=(c*T)/2$$

Where
D=the distance to the object
c=speed of light
T=the time difference between when the specific pulse 5 was emitted to when the pulse 5 was returned For current radar, a range of 250 km would yield a maximum PRF of 600 Hz. If the scan speed of the radar to scan a 360-degree volume was 60 seconds, then the angular resolution is 0.01 degrees.

$$360/(60*600)=0.01 \text{ degrees}$$

At 250 Km the samples are spaced 43.6 m apart $$\sin(0.01)*250=43.6m$$

This system design improves the resolution because each pulse 5 can be uniquely identified so N pulses can be transmitted at the PRF rate thus increasing angular resolution by N times. At a PRF of 6000 Hz and 10 different frequencies (fm0 thru fm9), then the resolution would be 0.001 degrees and a sample spacing at 250 km would be 4.36 m.

Doppler Or Radial Velocity Mode Processing

Doppler radar for weather is actually not using Doppler theory. The actual usage is to use two radar pulses timed close together so a distance range difference can be used to calculate velocity.

$$V=D*T$$

Where
V=Velocity of the object
D=the difference in distance detected using two samples
T=the PRF sample time interval=1/PRF Because the distance change is very small between two samples, current radar uses the phase angle difference of the received radar signal to detect the time difference between two radar returns. This creates the Doppler Nyquist dilemma. The problem occurs when object has traveled farther then the radar wavelength divided by 2.

$$D=W/2$$

Where
D=the distance the object moved between samples
W=wavelength of the radar signal Further the maximum unambiguous velocity of an object is derived from this equation:

$$V=+/-(c/(F*4))*PRF$$

Where
V=Maximum unambiguous velocity of the object
F=the radar frequency
c=speed of light
PRF=the pulse 5 repetition frequency For current radar running at 5 Ghz and using a PRF of 600 (for a maximum range of 250 Km), the maximum unambiguous velocity will be +/−9 m/sec In order to improve the Doppler velocity detection, the PRF must be increased and/or the frequency of the radar signal decreased.

Several system use a nonsymmetrical pulse 5 paring process to increase the maximum unambiguous velocity and/or increase the PRF. These techniques also introduce errors since ghosting signals (returns from prior transmissions) will generate false readings.

This system greatly improves the Doppler detection because the modulation frequency, fm, is much lower than the radar frequency. The modulation signal can be used to determine the positional change in the object. If the highest modulation frequency fmM of fm0 thru fmN, is 1/20 or more below the radar frequency, than the maximum unambiguous velocity is increased by 20 times.

And since the effective PRF (PRF-N) is N times faster than the current radars PRF, this increases the maximum unambiguous velocity be another N times.

$$V=+/-(c/(fmX*4))*PRF*N$$

Where
V=Maximum unambiguous velocity of the object
FmX=the maximum modulation frequency
c=speed of light
PRF=the pulse 5 repetition frequency for each sequence of N transmissions
N=the number of modulation frequencies used in the system So, for the same radar parameters as a current system,
Radar frequency=5 Ghz
PRF-N=6000 pulses/sec
Range=250 km
FM_0 thru FM_9=180 Mhz thru 200 Mz Thus, using 10 frequency modulations (fm0 thru fm9) and a maximum modulation frequency of 200 Mhz; the maximum unambiguous velocity will be +/−2250 m/s.

This will provide an unambiguous range of 250 km for both surveillance and Doppler.

This enables Doppler velocity detection over a very long distance and with a much greater velocity range.

Noise And Interference Rejection

Current radar system(s) receive all signals on their transmission frequency. The filter that is used is usually fairly broad. Many will pass signals in a 20 to 30 Mhz band around their transmission frequency. This pass band will frequently include other radars, WiFi signals, stray interference, or jamming signals.

The system described herein would reject these interference sources much further because the multi-band fm0 thru fmN signals have been filtered also. If the signal is not in the transmission carrier passband AND are not in the fm passbands, the signal is rejected. In addition, if the pulses are digitally coded, than the pulses can be further filtered to only allow valid codes are accepted. This triple filtering rejects most or all interference.

If the interference is in one of the fm0 thru fmN frequencies, the Signal processor 11 can use signal correlations rules involving the other fm returns to isolate and reject this false signal. These rules could compare adjacent pulses to see if there are returns on one fm but not on adjacent pulses fm +/−1, then the problem fm pulse 5 data could be muted.

When interference is detected the fm frequencies can be changed dynamically to different frequencies so as to eliminate the offending signals. This frequency hopping can be changed at any time. The Signal processor 11 must track the historical record and the BPF 1 thru BPF N must change to adapt to the corresponding signals.

Non-Limiting Exemplary Embodiments

Non-limiting exemplary embodiments of the invention include: a weather radar system 50 that includes a PRF generator 1 (includes a pulse generator and a pulse frequency selector), a modulator 2, a power amplifier 3, a low noise amplifier 6 receiver, a primary bandpass filter 7, a demodulator 8, a set of physical or virtual bandpass filters 7, variable gain intermediate-frequency amplifiers 10, a signal processor 11 and a display 12.

In some embodiments, the PRF generator 1, for example, may be configured to send pulse 5 parameters to the frequency selector to generate a number of different frequencies in a sequence of pulses 5; this may include the pulse 5 width, the frequency, the pulse 5 spacing or other details of the pulse 5 to be output; this same data may be passed on to the signal processor 11 for historical pulse 5 train tracking; the PRF generator 1 may also get feedback regarding detected interference to adjust the parameters to eliminate interference signals.

In some embodiments, the frequency selector 3 determines how to modulate the carrier being emitted; this may include modulation frequency, pulse 5 width, modulation type. An example of the carrier modulation type may be amplitude modulation, frequency modulation, pulse code modulation, pseudo-random patterns; or a combination of types.

In some embodiments, the modulator 2 and power amplifier 3 may be a magnetron, klystron, solid state device, light, sound, or other signal emitting system; the carrier that is modulated may change independently of the modulation.

In some embodiments, received return signal is amplified by a low noise amplifier (LNA) 6.

In some embodiments, the LNA 6 feeds the signal to the first bandpass filter 7; this filter removes signals outside the carrier frequency but does not remove the modulation sideband components passband.

In some embodiments, the demodulator 8 may demodulate amplitude, frequency, pulse coding, pseudo-random patterns and feed the demodulated signals thru bandpass filters 9.

In some embodiments, the bandpass filters 9 separate the different fm0 thru fmN signals based on the parameters defined in earlier embodiments from the PRF generator 1 such that the fm signals can be uniquely processed by the Signal processor 11.

An example of the filters 9 could be a frequency bandpass filters for amplitude modulated signals based on the frequency bandwidth defined in the PRF generator 1 and delivered by the demodulator 8.

An example of the filters 9 could be a data pattern separator that matched the pattern created in the PRF generator 1 delivered by the demodulator 8.

An example of the filters 9 could be a frequency deviation range or sideband from a frequency modulated signal created in the PRF generator 1 delivered by the demodulator 8.

In some embodiments, the signal processor 11 would treat each filtered fm signal from the I/F amplifiers 10 as a unique return; each fm signal is stored in a memory location that corresponds to a distance from the transmitter to the reflected object; the distance is calculated based on time-of-flight of the emitted signal and the PFR generator 1 trigger time for the specific fm signal.

The radar system 50 includes a pulse generator 1 that creates a single pulse 5 or a sequence of pulses 5 that can change the transmission signal modulation on each successive pulse 5 so that the returned signals can be easily separated from each other, and a modulator 2 that may emit a single modulated pulse 5 or a pulse 5 sequence. Advantageously, the modulator 2 is configured to react to the commands from the pulse generator 1 to change the modulation. Advantageously, the modulator 2 may change the type of modulation dynamically from amplitude modulation, frequency modulation, digital pattern modulation, and/or random pattern generation based on instructions from the pulse generator 1. Advantageously, the modulator 2 is configured to use a combination of modulation types based on conditions or needs. The radar system 50 further includes an amplifier 3 that boosts the signal that will be emitted from a radiating device, a switch 13 or passive device that separates transmission signals from the receiver path, a low noise amplifier 6 on the receive path that boosts the received signal for further processing, a bandpass filter 7 that passes the transmission carrier and relevant sideband image signals but removes unwanted signals, a demodulator 8 that exposes the modulation signals from the carrier, and a bank of physical or logical filters 9 that split the received signals into the different modulation pulses based on their modulation parameters. Advantageously, these filters 9 use information from the pulse generator 1 to decode the signal. The radar system 50 further includes one or more amplifiers 10 that boost the signal based on the time since the pulse 5 was transmitted to normalize signal amplitude based on signal loss passing thru the scanned media, a signal processor 11 that processes each signal from the amplifiers 10 and renders a composite display of the returned signals. The signal processor 11 can display returns from each different modulation signal or create an aggregate signal composed of multiple returns. The signal processor 11 uses multiple returns to generate a positional or range difference between pulses to determine velocity of the target object. Advantageously, the sequence of pulses 5 may repeat after a time interval and the transmitted pulse 5 information is sent to the modulator 2 and to the signal processor 11.

In a non-limiting exemplary embodiment, pulses 5 are generated that are short in duration but long enough to be modulated with a signal that can be readily split by a filter 9. In this manner, each modulation type is amplitude modulated, frequency modulated, pulse-code modulated, and/or data modulated, wherein the modulation type is dynamically changed in type, timing, amplitude, coding method when conditions or use indicate it is desired. A data parameter set is passed from the pulse generator 1 to the modulator 2, the bandpass filters 9, the amplifiers 10, and the signal processor 11.

In a non-limiting exemplary embodiment, the signal processor 11 can use the time-of-flight and the phase of the returned signal to determine the precise range of the object that reflected the signal. Such a signal processor 11 uses the range change and time interval between pulses to determine the velocity of the object.

In a non-limiting exemplary embodiment, the Doppler Dilemma is eliminated by using the modulation parameter instead of the primary carrier signal to determine object range.

In a non-limiting exemplary embodiment, interference is greatly reduced by filtering the carrier signal, also filters the modulation signal, so only signals that pass both filters are tagged as a valid signal, and filters the returned signal by the data coded in the returned signal.

The radar system 50 further includes a signal processor 11 that can detect interference and can then signal the pulse generator 1 to use a modulation that is less susceptible to the interference wherein the signal processor 11 is configured to reject a returned signal that does not correlate to signals on pulses received prior or subsequently to the offending pulse 5. Advantageously, the signal processor 11 is configured to filter the modulated return by rejecting frequencies, data miss-matches, or other out-of-band values to improve signal to noise performance(S/N). Advantageously, the signal processor 11 is configured to filter the modulated return by rejecting signals that do not adhere to the coding applied to the pulse 5 during modulation.

In a non-limiting exemplary embodiment, the secondary return errors are eliminated by distinguishing between the pulse 5 order in the sequence.

In a non-limiting exemplary embodiment, the radar system 50 includes a mechanism for distinguishing between pulses in a pulse 5 sequence and can act effectively as a very high pulse 5 repetition frequency (PRF) radar, a long-range radar, a long-range velocity detection radar, and a high angular resolution radar.

Referring to FIGS. 1-7, a pulse radar system 50 includes a pulse generator 1 located at a first location and configured to create at least one pulse 5 having a modulation signal and a carrier signal. Such a modulation signal is configured to be changed with each successive one of the at least one pulse 5 such that the at least one pulse 5 is easily separated from each other at a remote second location. The pulse radar system 50 further includes a modulator 2 in communication with the pulse generator 1 and configured to emit the modulation signal wherein the modulator 2 is further configured to react to commands from the pulse generator 1 to change the modulation signal. Advantageously, based on the commands received from the pulse generator 1, the modulator 2 is further configured to dynamically change a modulation type of the modulation signal selected from a group of modulation types including an amplitude modulation, a frequency modulation, a digital pattern modulation, and a random pattern generation modulation. The pulse radar system 50 further includes a signal processor 11 in communication with the at least one intermediate-frequency amplifier 10, and configured to process each the modulation signal from the at least one intermediate-frequency amplifier 10. Notably, the each successive one of the at least one pulse 5 is non-transitory and repeats after a time interval. Advantageously, the each successive one of the at least one pulse 5 is configured to have an increased transmission pulse rate and further configured to be uniquely tagged and thereby easily separated when received at the remote second location. In this manner, each successive one of the at least one pulse 5 is distinguished such that the radar system 50 is configured to act efficiently as a very high pulse repetition frequency radar system, a long-range radar system, a long range velocity detection radar system, and a high angular resolution radar system.

In a non-limiting exemplary embodiment, the signal processor 11 is further configured to render a composite display of each returned one of the modulation signal.

In a non-limiting exemplary embodiment, the modulator 2 is configured to use a combination of the modulation types based on real-time operating parameters at the first location and the remote second location.

In a non-limiting exemplary embodiment, the signal processor 11 is further configured to create an aggregate signal composed of each the returned one of the modulation signal.

In a non-limiting exemplary embodiment, the pulse radar system 50 further includes an amplifier 3 in communication with the modulator 2 and the pulse generator 1 and configured to boost the at least one pulse 5 emitted from an existing transceiver (antenna) 4.

In a non-limiting exemplary embodiment, the pulse radar system 50 further includes a switch 13 in communication with the existing transceiver 4 and positioned along a receiver signal path. Such a switch 13 is configured to separate the at least one pulse 5 traveling along the receiver signal path.

In a non-limiting exemplary embodiment, the pulse radar system 50 further includes a low noise amplifier 6 in communication with the switch 13 via the receiver signal path, and configured to boost the at least one pulse 5.

In a non-limiting exemplary embodiment, the pulse radar system 50 further includes a bandpass filter 7 in communication with the low noise amplifier 6, and configured to pass the carrier signal and existing relevant sideband image signals of the modulation signal. Such a bandpass filter 7 is further configured to remove unwanted signals from the modulation signal.

In a non-limiting exemplary embodiment, the pulse radar system 50 further includes a demodulator 8 in communication with the bandpass filter 7, and configured to expose the modulation signal from the carrier signal.

In a non-limiting exemplary embodiment, the pulse radar system 50 further includes a bank of filters 9 in communication with the demodulator 8, and configured to split the modulation signal into the modulation types based on associated ones of the real-time operating parameters.

In a non-limiting exemplary embodiment, the bank of filters 9 are configured to use information from the pulse generator 1 to decode the modulation signal.

In a non-limiting exemplary embodiment, the pulse radar system 50 further includes at least one intermediate-frequency amplifier 10 in communication with the bank of filters 9, and configured to boost the modulation signal based on time since the at least one pulse 5 was transmitted to normalize signal amplitude based on signal loss passing thru an existing scanned media.

In a non-limiting exemplary embodiment, the signal processor 11 is further configured to use multiple ones of the returned modulation signals to generate a positional value or range difference value between alternate ones of the at least one pulse 5 and thereby determine a velocity of a target object. Notably, the information about the at least one pulse 5 is sent to the modulator 2 and to the signal processor 11.

In a non-limiting exemplary embodiment, the at least one pulse 5 includes one of a single pulse 5 and a pulse signal sequence 5.

In a non-limiting exemplary embodiment, the switch 13 includes a passive device.

In a non-limiting exemplary embodiment, the filters 9 includes one of physical filters and logical filters.

In a non-limiting exemplary embodiment, the modulation type is configured to be dynamic and split by the filter wherein the pulse generator 1 passes a data parameter set to the modulator 2, the bandpass filter 7, the at least one intermediate-frequency amplifier 10, and the signal processor 11.

In a non-limiting exemplary embodiment, the signal processor 11 is further configured to use a time-of-flight and a phase of the modulation of the at least one pulse 5 to determine a precise range of the object that reflected the at least one pulse 5. Such a signal processor 11 is configured to use a range change and a time interval between successive ones of the at least one pulse 5 to determine a velocity of the object.

In a non-limiting exemplary embodiment, doppler dilemma is eliminated by using the modulation type of the modulation signal instead of the carrier signal to determine object range.

In a non-limiting exemplary embodiment, the signal processor 11 is further configured so that interference is reduced by filtering the carrier signal and the modulation signal, so only selected one of the modulation signals that pass both of the bank of filters 9 and the selected modulation signals are tagged as a valid modulation signal. Advantageously, the signal processor 11 is further configured to detect interference and notify the pulse generator 1 to use one of the modulation types that is less susceptible to the interference. In this manner, the signal processor 11 is further configured to reject an offending signal that does not correlate to one of the at least one pulse 5 received prior or subsequently to the offending signal.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A pulse radar system comprising:
   a pulse generator located at a first location and configured to create at least one pulse having a modulation signal and a carrier signal, said modulation signal being configured to be changed with each successive one of said at least one pulse such that said at least one pulse is separated from each other at a remote second location;
   a modulator in communication with said pulse generator and configured to emit said modulation signal; wherein said modulator is further configured to react to commands from said pulse generator to change said modulation signal; wherein, based on said commands received from said pulse generator, said modulator is further configured to dynamically change a modulation type of said modulation signal selected from a group of modulation types including an amplitude modulation, a frequency modulation, a digital pattern modulation, and a random pattern generation modulation; and
   a signal processor in communication with said at least one intermediate-frequency amplifier, and configured to process each said modulation signal from said at least one intermediate-frequency amplifier;
   wherein said each successive one of said at least one pulse repeats after a time interval;
   wherein said each successive one of said at least one pulse is configured to have a transmission pulse rate and further configured to be uniquely tagged;
   wherein said each successive one of said at least one pulse is distinguished such that said pulse radar system is configured to act efficiently as a pulse repetition frequency pulse radar system, a long-range pulse radar system, a long range velocity detection pulse radar system, and a high angular resolution pulse radar system.

2. The pulse radar system according to claim 1, wherein said signal processor is further configured to render a composite display of each returned one of said modulation signal.

3. The pulse radar system according to claim 2, wherein said modulator is configured to use a combination of said modulation types based on real-time operating parameters at said first location and said remote second location.

4. The pulse radar system according to claim 3, wherein said signal processor is further configured to create an aggregate signal composed of each said returned one of said modulation signal.

5. The pulse radar system according to claim 4, further comprising: an amplifier in communication with said modulator and said pulse generator and configured to boost said at least one pulse emitted from an existing transceiver.

6. The pulse radar system according to claim 5, further comprising: a switch 13 in communication with said existing transceiver and positioned along a receiver signal path, said switch 13 being configured to separate said at least one pulse traveling along said receiver signal path.

7. The pulse radar system according to claim 6, further comprising: a low noise amplifier in communication with said switch 13 via said receiver signal path, and configured to boost said at least one pulse.

8. The pulse radar system according to claim 7, further comprising: a bandpass filter in communication with said low noise amplifier, and configured to pass said carrier signal and existing relevant sideband image signals of said modulation signal, said bandpass filter being further configured to remove unwanted signals from said modulation signal.

9. The pulse radar system according to claim 8, further comprising: a demodulator in communication with said bandpass filter, and configured to expose said modulation signal from said carrier signal.

10. The pulse radar system according to claim 9, further comprising: a bank of filters in communication with said demodulator, and configured to split said modulation signal into said modulation types based on associated ones of said real-time operating parameters.

11. The pulse radar system according to claim 10, further comprising: wherein said bank of filters are configured to use information from said pulse generator to decode said modulation signal.

12. The pulse radar system according to claim 11, further comprising: at least one intermediate-frequency amplifier in communication with said bank of filters, and configured to boost said modulation signal based on time since said at least one pulse was transmitted to normalize signal amplitude based on signal loss passing thru an existing scanned media.

13. The pulse radar system according to claim 12, wherein said signal processor is further configured to use multiple ones of said returned modulation signals to generate a positional value or range difference value between alternate ones of said at least one pulse and thereby determine a velocity of a target object;
wherein the information about said at least one pulse is sent to said modulator and to said signal processor.

14. The pulse radar system according to claim 13, wherein said at least one pulse comprises: one of a single pulse and a pulse signal sequence.

15. The pulse radar system according to claim 14, wherein said switch 13 comprises:
a passive device.

16. The pulse radar system according to claim 15, wherein said filters comprises: one of physical filters and logical filters.

17. The pulse radar system according to claim 16, wherein said modulation type is configured to be dynamic and split by said filter;
wherein said pulse generator passes a data parameter set to said modulator, said bandpass filter, said at least one intermediate-frequency amplifier, and said signal processor.

18. The pulse radar system according to claim 1, wherein said signal processor is further configured to use a time-of-flight and a phase of said modulation of said at least one pulse to determine a precise range of said object that reflected said at least one pulse; said signal processor further being configured to use a range change and a time interval between successive ones of said at least one pulse to determine a velocity of said object.

19. The pulse radar system according to claim 1, wherein doppler dilemma is eliminated by using said modulation type of said modulation signal instead of said carrier signal to determine object range.

20. The pulse radar system according to claim 1, wherein said signal processor is further configured so that interference is reduced by filtering said carrier signal and said modulation signal, so only selected ones of said modulation signals that pass both of said bank of filters and said selected one of said modulation signals are tagged as a valid modulation signal;
wherein said signal processor is further configured to detect interference and notify said pulse generator to use one of said modulation types that is less susceptible to said interference; and
wherein said signal processor is further configured to reject an offending signal that does not correlate to one of said at least one pulse received prior or subsequently to said offending signal.

* * * * *